United States Patent
Xu et al.

(10) Patent No.: US 10,044,594 B2
(45) Date of Patent: Aug. 7, 2018

(54) COLLABORATION METHOD AND DEVICE FOR VERIFYING BEHAVIOR IN ROUTE SWITCHING SYSTEM

(71) Applicant: Tsinghua University, Beijing (CN)

(72) Inventors: Ke Xu, Beijing (CN); Xuan Liu, Beijing (CN); Meng Shen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 49 days.

(21) Appl. No.: 15/093,691

(22) Filed: Apr. 7, 2016

(65) Prior Publication Data
US 2016/0301596 A1    Oct. 13, 2016

(30) Foreign Application Priority Data
Apr. 9, 2015    (CN) .......................... 2015 1 0166513

(51) Int. Cl.
*H04L 12/26* (2006.01)
*H04L 12/721* (2013.01)

(52) U.S. Cl.
CPC .............. *H04L 43/50* (2013.01); *H04L 45/12* (2013.01)

(58) Field of Classification Search
CPC ................................ H04L 43/50; H04L 45/12
See application file for complete search history.

(56) References Cited

U.S. PATENT DOCUMENTS 6,256,598 B1 *    7/2001    Park .................... G05B 19/056
700/100

* cited by examiner

*Primary Examiner* — Ronald B Abelson
(74) *Attorney, Agent, or Firm* — Kile Park Reed & Houtteman PLLC

(57) ABSTRACT

A collaboration method and device for verifying a behavior in a route switching system are provided. The method includes: evaluating a plurality of evaluating indicators in a plurality of verification methods to obtain valid evaluating indicators; generating a comprehensive efficiency attribute value set and a comprehensive cost attribute value set according to the valid evaluating indicators; generating weights of the valid evaluating indicators according to importance of the valid evaluating indicators; calculating a comprehensive efficiency value corresponding to each verification method and a comprehensive cost value corresponding to each verification method according to the weights of the valid evaluating indicators and values of the valid evaluating indicators in each verification method; establishing a state transition equation according to the comprehensive efficiency value corresponding to each verification method and the comprehensive cost value corresponding to each verification method, and solving the state transition equation to obtain an optimal solution.

14 Claims, 3 Drawing Sheets

COLLABORATION METHOD AND DEVICE FOR VERIFYING BEHAVIOR IN ROUTE SWITCHING SYSTEM

CROSS REFERENCE TO RELATED APPLICATION

This application claims priority to and benefits of Chinese Patent Application No. 201510166513.4, filed with State Intellectual Property Office on Apr. 9, 2015, the entire contents of which are incorporated herein by reference.

TECHNICAL FIELD

The present disclosure relates to a router field, and more particularly, to a collaboration method for verifying a behavior in a route switching system and a collaboration device for verifying a behavior in a route switching system.

BACKGROUND

With the development of the internet technology, the scale and number of protocols running in the route switching system increase sharply. Exacting requirements for safety and reliably of the route switching system are proposed in the business such as the electronic commerce, the teleconsultation business or the like. However, the conventional method for verifying a behavior in a route switching system cannot satisfy the requirements due to complexity of the route switching system.

At present, the method for verifying a behavior in a route switching system is performed by verifying all characteristics and functions of the route switching system to guarantee that the route switching system can run with satisfying the anticipative functions. The conventional method for verifying a behavior in a route switching system is monotonous, and advantages of various methods cannot be possessed. By taking various methods to verify the behavior respectively, the verifying process will be complex.

SUMMARY

Embodiments of a first aspect of the present disclosure provide a collaboration method for verifying a behavior in a route switching system, including: evaluating a plurality of evaluating indicators in a plurality of verification methods to obtain valid evaluating indicators according to a predetermined requirement; generating a comprehensive efficiency attribute value set and a comprehensive cost attribute value set according to the valid evaluating indicators; generating weights of the valid evaluating indicators according to importance of the valid evaluating indicators; calculating a comprehensive efficiency value corresponding to each verification method and a comprehensive cost value corresponding to each verification method according to the weights of the valid evaluating indicators and corresponding values of the valid evaluating indicators in each verification method, in which the corresponding values of the valid evaluating indicators are obtained from the comprehensive efficiency attribute value set or the comprehensive cost attribute value set; establishing a state transition equation according to the comprehensive efficiency value corresponding to each verification method and the comprehensive cost value corresponding to each verification method, and solving the state transition equation to obtain an optimal solution.

With the collaboration method for verifying a behavior in a route switching system according to embodiments of the present disclosure, the combination of verification methods achieving the most effective behavior verification may be determined, the accuracy and comprehensiveness of verifying the behavior in the route switching system may be increased and the cost and time of verifying the behavior in the route switching system may be reduced, such that the reliably and benefit of verifying the behavior in the route switching system may be improved.

Embodiments of a second aspect of the present disclosure provide a collaboration device for verifying a behavior in a route switching system, including: an evaluating module, configured to evaluate a plurality of evaluating indicators in a plurality of verification methods to obtain valid evaluating indicators according to a predetermined requirement; a first generating module, configured to generate a comprehensive efficiency attribute value set and a comprehensive cost attribute value set according to the valid evaluating indicators; a second generating module, configured to generate weights of the valid evaluating indicators according to importance of the valid evaluating indicators; a calculating module, configured to calculate a comprehensive efficiency value corresponding to each verification method and a comprehensive cost value corresponding to each verification method according to the weights of the valid evaluating indicators and corresponding values of the valid evaluating indicators in each verification method, in which the corresponding values of the valid evaluating indicators are obtained from the comprehensive efficiency attribute value set or the comprehensive cost attribute value set; a first establishing module, configured to establish a state transition equation according to the comprehensive efficiency value corresponding to each verification method and the comprehensive cost value corresponding to each verification method, and to solve the state transition equation so as to obtain an optimal solution.

With the collaboration device for verifying a behavior in a route switching system according to embodiments of the present disclosure, the combination of verification methods achieving the most effective behavior verification may be determined, the accuracy and comprehensiveness of verifying the behavior in the route switching system may be increased and the cost and time of verifying the behavior in the route switching system may be reduced, such that the reliably and benefit of verifying the behavior in the route switching system may be improved.

Embodiments of a third aspect of the present disclosure provide a non-transitory computer-readable storage medium having stored therein instructions that, when executed by a processor of a device, causes the device to perform the collaboration method for verifying a behavior in a route switching system according to the first aspect of the present disclosure.

Additional aspects and advantages of embodiments of present disclosure will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
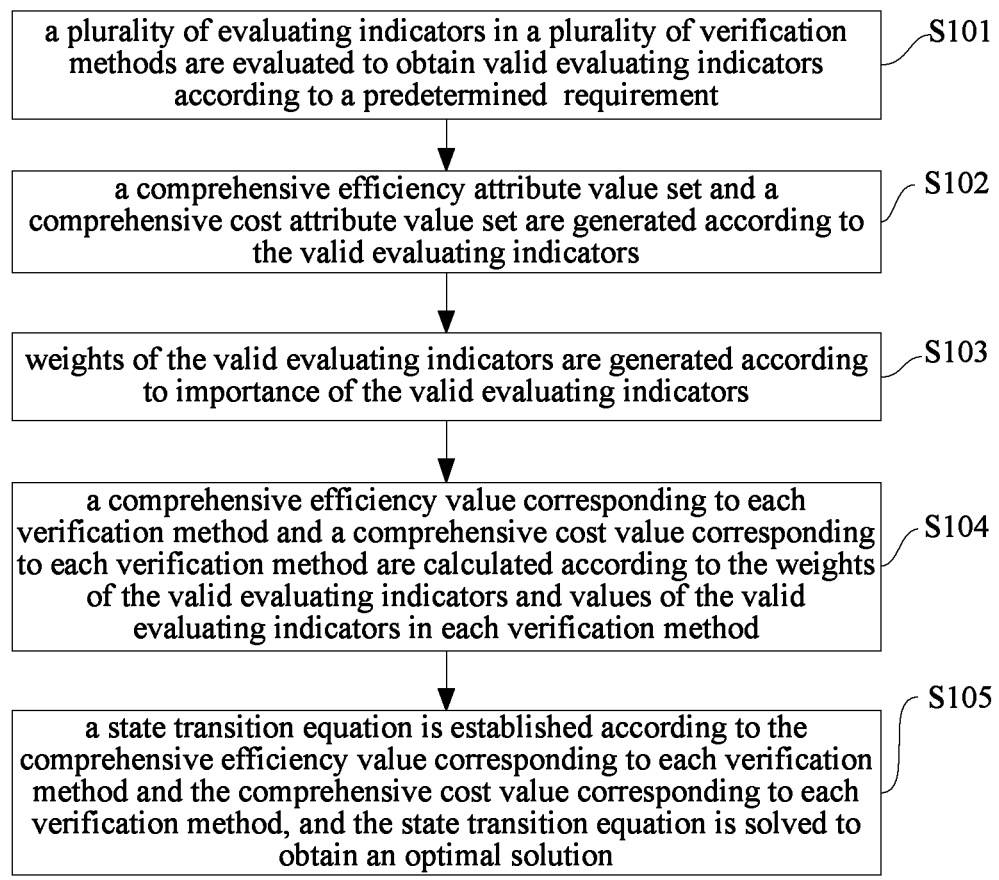
FIG. 1 is a flow chart showing a collaboration method for verifying a behavior in a route switching system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

In the following, a collaboration method and a collaboration device for verifying a behavior in a route switching system according to embodiments of the present disclosure will be described in detail with reference to drawings.

It should be noted that, the collaboration method for verifying a behavior in a route switching system provided by the present disclosure is a collaboration method based on various verification methods, so as to realize an efficient behavior verification of the route switching system.

FIG. 1 is the flow chart showing a collaboration method for verifying a behavior in a route switching system according to an embodiment of the present disclosure. As shown in FIG. 1, the collaboration method for verifying a behavior in a route switching system may include following steps.

In step S101, a plurality of evaluating indicators in a plurality of verification methods are evaluated to obtain valid evaluating indicators according to a predetermined requirement.

Specifically, the plurality of evaluating indicators may be evaluated according to the verification object system and the actual verification environment. That is, it is determined whether the plurality of evaluating indicators satisfy the predetermined requirement (such as a behavior verification requirement). If yes, it is determined that the plurality of evaluating indicators are verified successfully, and the plurality of evaluating indicators which are verified successfully may be considered as the valid evaluating indicators and then step S102 is followed.

In an embodiment of the present disclosure, the plurality of evaluating indicators includes: a verification result V, a defect detection rate E, a labor requirement P, time required T and a fund demand F and so on.

In an embodiment of the present disclosure, the plurality of evaluating indicators includes evaluating indicators corresponding to a first verification of a data plane behavior in the route switching system and evaluating indicators corresponding to a second verification of a control plane behavior in the route switching system, and before step S101, the collaboration method for verifying a behavior in a route switching system may further include a step of establishing a first extendible attribute value set corresponding to the first verification and a second extendible attribute value set corresponding to the second verification, in which the first extendible attribute value set includes the evaluating indicators corresponding to the first verification and the second extendible attribute value set includes the evaluating indicators corresponding to the second verification.

Specifically, the plurality of evaluating indicators may be determined according to the plurality of verification methods. For example, the plurality of evaluating indicators may include: the verification result V, the defect detection rate E, the labor requirement P, the time required T and the fund demand F and so on. An extendible interface of evaluating indicators may be established according to the object to be verified in the route switching system. The plurality of verification methods may be conventional verification methods in the related art. That is, the plurality of evaluating indicators are determined based on the conventional verification methods.

In some embodiments of the present disclosure, step S101 may include following substeps.

(1) It is determined whether the plurality of evaluating indicators satisfy the predetermined requirement.

(2) The valid evaluating indicators corresponding to the predetermined requirement are obtained if the plurality of evaluating indicators satisfy the predetermined requirement.

(3) New evaluating indicators are added according to the predetermined requirement if the plurality of evaluating indicators do not satisfy the predetermined requirement, and then it is determined whether the new evaluating indicators satisfy the behavior verification requirement, so as to repeat (1)-(3).

It should be noted that, in some embodiments of the present disclosure, if the plurality of evaluating indicators do not satisfy the predetermined requirement, n new evaluating indicators ($\{A_i | i=0, 1, \ldots, n\}$) should be created, where n is a positive integer and may be determined according to the predetermined requirement. Specifically, if the plurality of evaluating indicators do not satisfy the requirement of verifying the behavior, n new evaluating indicators are created to ensure that the valid evaluating indicators satisfy the requirement of verifying the behavior can be obtained.

In step S102, a comprehensive efficiency attribute value set and a comprehensive cost attribute value set are generated according to the valid evaluating indicators.

The comprehensive efficiency attribute value set VFE and the comprehensive cost attribute value set VCE are generated according to the valid evaluating indicators. For example, the comprehensive efficiency attribute value set VFE may include the verification result V, the defect detection rate E and the like. The comprehensive cost attribute value set VCE may include the labor requirement P, the time required T, and the fund demand F and the like.

In an embodiment of the present disclosure, an implementation of generating the comprehensive efficiency attribute value set VFE and the comprehensive cost attribute value set VCE according to the valid evaluating indicators may include steps of:

dividing the evaluating indicators in each verification method into two groups: a verification efficiency group and a verification cost group;

generating the comprehensive efficiency attribute value set VFE corresponding to the verification object system and the actual verification environment according to the verification efficiency group;

generating the comprehensive cost attribute value set VCE corresponding to the verification object system and the actual verification environment according to the verification cost group.

In some embodiments of the present disclosure, the values of the valid evaluating indicators in the comprehensive efficiency attribute value set VFE and the comprehensive cost attribute value set VCE correspond to following requirements.

1. The verification result V: in the plurality of verification methods, the maximal value of the verification result V is 100. And if evaluating indicators of the verification method do not contain the verification result V, it is determined that the value of the verification result V in this verification method is 0, i.e. the minimal value of the verification result V is 0. Thus, the value range of the verification result V is 0-100, and the verification result V is a rational number.

2. The defect detection rate E: in the plurality of verification methods, the maximal value of the defect detection rate E is 100. And if evaluating indicators of the verification method do not contain the defect detection rate E, it is determined that the value of the defect detection rate E in this verification method is 0, i.e. the minimal value of the defect detection rate E is 0. Thus, the value range of the defect detection rate E is 0-100, and the defect detection rate E is a rational number.

3. The labor requirement P: in the plurality of verification methods, the maximal value of the labor requirement P is 100. And if evaluating indicators of the verification method do not contain the labor requirement P, it is determined that the value of the labor requirement P in this verification method is 0, i.e. the minimal value of the labor requirement P is 0. Thus, the value range of the labor requirement P is 0-100, and the labor requirement P is a rational number.

4. The time required T: in the plurality of verification methods, the maximal value of the time required T is 100. And if evaluating indicators of the verification method do not contain the time required T, it is determined that the value of the time required T in this verification method is 0, i.e. the minimal value of the time required T is 0. Thus, the value range of the time required T is 0-100, and the time required T is a rational number.

5. The fund demand F: in the plurality of verification methods, the maximal value of the fund demand F is 100. And if evaluating indicators of the verification method do not contain the fund demand F, it is determined that the value of the fund demand F in this verification method is 0, i.e. the minimal value of the fund demand F is 0. Thus, the value range of the fund demand F is 0-100, and the fund demand F is a rational number.

It should be understood that, each attribute in the comprehensive efficiency attribute value set VFE may be configured to evaluate the effect of the verification method. If the effect of the verification method is the best, the values of the evaluating indicators in the comprehensive efficiency attribute value set VFE corresponding to this verification method may be set as 100. And if there is no effect of this verification method, the values of the evaluating indicators in the comprehensive efficiency attribute value set VFE corresponding to this verification method may be set as 0. If the effect of this verification method is between the best and the worst (no effect), the values of the evaluating indicators in the comprehensive efficiency attribute value set VFE corresponding to this verification method may be set as a rational number between 0 and 100. Each attribute in the comprehensive cost attribute value set VCE may be configured to evaluate the cost of the verification method. If the cost of the verification method is the highest, the values of the evaluating indicators in the comprehensive cost attribute value set VCE corresponding to this verification method may be set as 100. And if there is no cost of this verification method, the values of the evaluating indicators in the comprehensive cost attribute value set VCE corresponding to this verification method may be set as 0. If the cost of this verification method is between the highest and the lowest (no cost), the values of the evaluating indicators in the comprehensive cost attribute value set VCE corresponding to this verification method may be set as a rational number between 0 and 100.

It should be noted that, in some embodiments of the present disclosure, the plurality of evaluating indicators may be divided into two types: quantifiable evaluating indicators and nonquantifiable evaluating indicators. A nonquantifiable evaluating indicator may be set as a value according to a requirement, and a relative relationship between two nonquantifiable evaluating indicators should be determined according to values of the two nonquantifiable evaluating indicators. Take the time required T as an example to explain a way of calculating the value of the time required T. For example, the time required T corresponding to the verification method a is 30 hours, and the time required T corresponding to the verification method b is 20 hours. Assuming that the value of the time required T corresponding to the verification method a is 100, the value of the time required T corresponding to the verification method b may be 20*(100/30)=66.67.

In step S103, weights of the valid evaluating indicators are generated according to importance of the valid evaluating indicators.

Specifically, the importance of the valid evaluating indicators in this verification process is determined according to the verification object system and the actual verification environment, and then the weights of the valid evaluating indicators are determined according to the importance of the valid evaluating indicators. It should be understood that, if the more important a valid evaluating indicator is, the bigger the weight of this valid evaluating indicator is. More specifically, in some embodiments of the present disclosure, the weight of the valid evaluating indicator in the comprehensive efficiency attribute value set VFE is subject to formula (1):

$$\sum_{i \in VFE} W_i = 1, W_i \in \{Q^+\}, \quad (1)$$

and the weight of the valid evaluating indicator in the comprehensive cost attribute value set VCE is subject to formula (2):

$$\sum_{j \in VFC} W_j = 1, W_j \in \{Q^+\}, \quad (2)$$

where VFE represents the comprehensive efficiency attribute value set, $W_i$ represents a weight of a $i^{th}$ valid evaluating indicator, VFC represents the comprehensive cost attribute value set, $W_j$ represents a weight of a $j^{th}$ valid evaluating indicator, and $Q^+$ represents a set of rational numbers.

In step S104, a comprehensive efficiency value corresponding to each verification method and a comprehensive cost value corresponding to each verification method are calculated according to the weights of the valid evaluating indicators and corresponding values of the valid evaluating indicators in each verification method, in which the corresponding values of the valid evaluating indicators are obtained from the comprehensive efficiency attribute value set or the comprehensive cost attribute value set.

Specifically, in some embodiments of the present disclosure, the comprehensive efficiency value corresponding to each verification method may be calculated according to formula (3):

$$ZE_m = \text{Round}\left[\frac{\sum_{i \in VFE} W_i * V_{im}}{\sum_{m \in MV} \sum_{i \in VFE} W_i * V_{im}} * 10\right], \quad (3)$$

and
the comprehensive cost value corresponding to each verification method may be calculated according to formula (4):

$$ZC_m = \text{Round}\left[\frac{\sum_{j \in VFC} W_j * V_{jm}}{\sum_{m \in MV} \sum_{j \in VFC} W_j * V_{jm}} * 10\right], \quad (4)$$

where MV represents the plurality of verification methods, $ZE_m$ represents a comprehensive efficiency value corresponding to a $m^{th}$ verification method, $V_{im}$ represents a value of the $i^{th}$ valid evaluating indicator in the $m^{th}$ verification method, and $ZC_m$ represents a comprehensive cost value corresponding to the $m^{th}$ verification method, $V_{jm}$ represents a value of the $j^{th}$ valid evaluating indicator in the $m^{th}$ verification method.

In step S105, a state transition equation is established according to the comprehensive efficiency value corresponding to each verification method and the comprehensive cost value corresponding to each verification method, and the state transition equation is solved to obtain an optimal solution.

Specifically, after obtaining the comprehensive efficiency value corresponding to each verification method and the comprehensive cost value corresponding to each verification method, the combination of verification methods with best efficiency may be obtained. More specifically, a desired cost value EE may be determined according to an actual requirement, and the problem of obtaining the combination of verification methods with best efficiency may be converted to a 0-1 knapsack problem. Assuming that there are m verification methods and that the comprehensive efficiency value corresponding to each verification method and the comprehensive cost value corresponding to each verification method are obtained, the combination of verification methods with best efficiency may be determined, such that the sum of the comprehensive cost values of the verification methods is not greater than the desired cost value EE and the sum of the comprehensive efficiency values of the verification methods is maximal.

In other words, the problem of obtaining the combination of verification methods with best efficiency may be understood in this way: assuming that $EE>0$, $ZC_m>0$, $ZE_m>0$, $1 \le m \le M$, where M represent the number of the plurality of verification methods, a vector with M elements $(x_1, x_2, \ldots, x_m, \ldots, x_M)$, $x_m \in \{0,1\}$ is calculated to ensure that $\sum_{m=1}^{M} ZC_m x_m \le EE$ and $\sum_{m=1}^{M} ZE_m x_m$ is maximal, i.e. the vector is subject to formula (5):

$$\begin{cases} \max \sum_{m=1}^{M} ZE_m x_m \\ \sum_{m=1}^{M} ZC_m x_m \le EE \\ x_m \in \{0, 1\}, 1 \le m \le M \end{cases} \quad (5)$$

Specifically, in some embodiments of the present disclosure, the combination of verification methods with best efficiency may be obtained by following substeps.

(1) A state transition equation (6) is established according to the comprehensive efficiency value corresponding to each verification method and the comprehensive cost value corresponding to each verification method.

$$f[m,t] = \max\{f[m-1, t-ZC_m] + ZE_m, f[m-1, t]\} \quad (6)$$

where $1 \le t \le EE$.

(2) All of steps of calculating $f[m,t]$ is recorded. If $f[m-1, t-ZC_m] + ZE_m > f[m-1, t]$, let $x_m=1$, else let $x_m=0$. It may be understood that, $x_m=1$ represents that the $m^{th}$ verification method is one of the combination of verification methods with best efficiency, and $x_m=0$ represents that the $m^{th}$ verification method is not one of the combination of verification methods with best efficiency.

Figure 2:
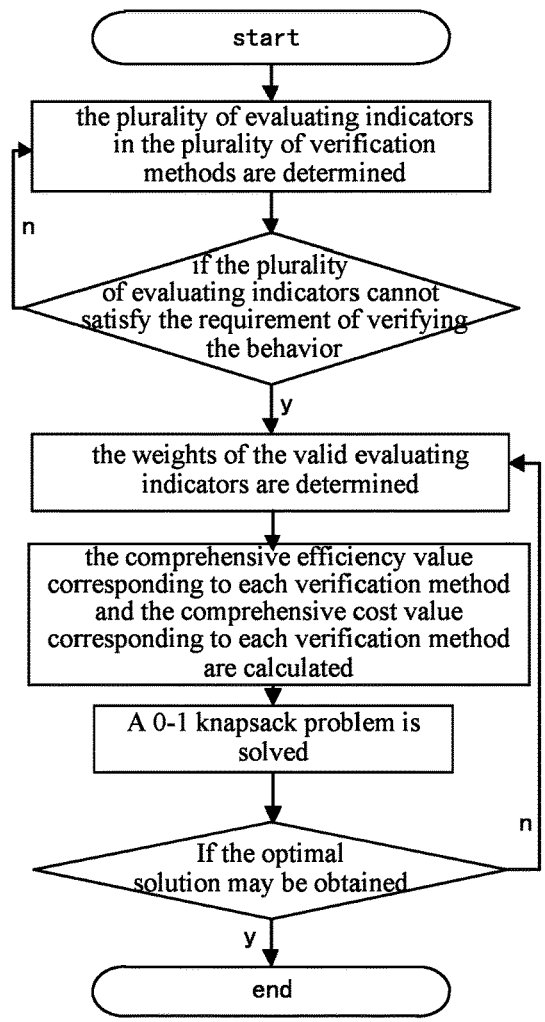
FIG. 2 is a flow chart showing a collaboration method for verifying a behavior in a route switching system according to an embodiment of the present disclosure.

In conclusion, as shown in FIG. 2, with the collaboration method for verifying a behavior in a route switching system, the plurality of evaluating indicators in the plurality of verification methods may be determined, and then the plurality of evaluating indicators are evaluated, if the plurality of evaluating indicators cannot satisfy the requirement of verifying the behavior, new evaluating indicators are created to obtain valid evaluating indicators, if the plurality of evaluating indicators can satisfy the requirement of verifying the behavior, the plurality of evaluating indicators may be used as the valid evaluating indicators. And after the valid evaluating indicators are determined, the weights of the valid evaluating indicators are determined. The comprehensive efficiency value corresponding to each verification method and the comprehensive cost value corresponding to each verification method are calculated according to the weights of the valid evaluating indicators and values of the valid evaluating indicators in each verification method. A 0-1 knapsack problem is solved according to the comprehensive efficiency value corresponding to each verification method and the comprehensive cost value corresponding to each verification method to determine whether an optimal solution may be obtained. If the optimal solution may be obtained, the combination of verification methods with best efficiency may be determined according to the optimal solution. If the optimal solution is not obtained, the weights of the valid evaluating indicators are re-determined until the optimal solution is obtained.

With the collaboration method for verifying a behavior in a route switching system according to embodiments of the present disclosure, the combination of verification methods achieving the most effective behavior verification may be determined, the accuracy and comprehensiveness of verifying the behavior in the route switching system may be increased and the cost and time of verifying the behavior in the route switching system may be reduced, such that the reliably and benefit of verifying the behavior in the route switching system may be improved.

In order to make those skilled in the art to understand the present disclosure, in the following, take an example to explain.

Assume that a behavior in a route switching system is verified, a higher defect detection rate is required, the verification is needed to be finished as soon as possible with limited labors and the fund is not limited. Assuming that there are three verification methods (such as verification method A, verification method B, verification method C), the collaboration method for verifying a behavior in a route switching system may be performed as follows.

For each of the verification methods A, B and C, a first extendible attribute value set corresponding to the first verification of a data plane behavior in the route switching system and a second extendible attribute value set corresponding to the second verification a control plane behavior in the route switching system are established respectively, in which the first extendible attribute value set includes the evaluating indicators corresponding to the first verification and the second extendible attribute value set includes the evaluating indicators corresponding to the second verification. And then, the plurality of evaluating indicators are evaluated to obtain an evaluation result indicating that a verification result V, a defect detection rate E, a labor requirement P, time required T, and a fund demand F satisfy the requirement of verifying the behavior. A comprehensive efficiency attribute value set VFE={V,E} and a comprehensive cost attribute value set VFC={P, T, F} corresponding to the verification object system and the actual verification environment are determined. The value of each evaluating indicator in the comprehensive efficiency attribute value set VFE is set according to the value range of each evaluating indicator. The value of each evaluating indicator in the comprehensive cost attribute value set VCE is set according to the value range of each evaluating indicator. For example, the values of the evaluating indicators in the comprehensive efficiency attribute value set VFE and corresponding to each of the verification methods A, B and C are the shown in table 1, and the values of the evaluating indicators in the comprehensive cost attribute value set VCE and corresponding to each of the verification methods A, B and C are the shown in table 1.

TABLE 1

|   | V   | E   | P   | T   | F   |
|---|-----|-----|-----|-----|-----|
| A | 40  | 70  | 60  | 100 | 90  |
| B | 50  | 80  | 100 | 70  | 100 |
| C | 100 | 100 | 50  | 60  | 90  |

According to the verification object system and the actual verification environment, it is determined that the defect detection rate E in the comprehensive efficiency attribute value set VFE is more important and the labor requirement P and the time required T in the comprehensive cost attribute value set VCE are more important. Thus, the weight of the verification result V may be respectively set as 0.4 and the defect detection rate E may be set as 0.6 (i.e. $W_V=0.4$, $W_E=0.6$), the weight of the labor requirement P may be respectively set as 0.4, the time required T may be set as 0.6 and the fund demand F may be set as 0.2 (i.e. $W_P=0.4$, $W_T=0.4$, $W_F=0.2$).

Then, a comprehensive efficiency value corresponding to each verification method and a comprehensive cost value corresponding to each verification method are calculated according to the weights of the valid evaluating indicators and values of the valid evaluating indicators in each verification method using formulas (3) and (4), as shown in table 2.

TABLE 2

|   | $ZE_j$ | $ZC_j$ |
|---|--------|--------|
| A | 3      | 4      |
| B | 3      | 4      |
| C | 4      | 3      |

Apparently, from table 2, we can see that max $ZC_m \leq EE \leq \Sigma ZC_m$, where EE=10.

Lastly, the combination of verification methods may be obtained according to the comprehensive efficiency value corresponding to each verification method and the comprehensive cost value corresponding to each verification method. In the following, a way of obtaining the combination of verification methods will be described.

Firstly, table 3 is created.

TABLE 3

|   | 1 | 2 | 3 | 4 | 5 | 6 | 7 | 8 | 9 | 10 | $ZE_m$ | $ZC_m$ |
|---|---|---|---|---|---|---|---|---|---|----|--------|--------|
| A |   |   |   |   |   |   |   |   |   |    | 3      | 4      |
| B |   |   |   |   |   |   |   |   |   |    | 3      | 4      |
| C | 0 |   |   |   |   |   |   |   |   |    | 4      | 3      |

Next, values to be filled in the table 3 are calculated from bottom to top and from left to right. FIGS. 1-10 in the first row represent that the value range of the desired cost value EE is 1-10. For ease of description, the cell located at the fourth row and second column is represented by C1.

1. Values in the cells C1-C10 are calculated

Assuming that only the verification method C is available, the values in the cells C1-C10 can be calculated.

The value in the cell C1 indicates the comprehensive efficiency value of the verification method C in the case that the desired cost value EE is 1. Since the comprehensive cost value of the verification method C is 3 which is greater than the desired cost value EE, the value in the cell C1 is "0", thus "0" is filled in the cell C1. Likewise, C2=0.

The value in the cell C3 (the cell located at the fourth row and fourth column) indicates the comprehensive efficiency value of the verification method C in the case that the desired cost value EE is 3. Since the comprehensive cost value of the verification method C is 3 which is not greater than the desired cost value EE, the value in the cell C3 is the comprehensive efficiency value of the verification method C, thus "4" is filled in the cell C 3. Likewise, "4" is filled in the cells C4-C10.

2. Values in the cells B1-B10 are calculated

Assuming that the verification method C and the verification method B are available, the values in the cells B1-B10 can be calculated.

The value in the cell B1 (the cell located at the third row and second column) indicates the comprehensive efficiency value of the combination of the verification method C and the verification method B in the case that the desired cost value EE is 1. Since the comprehensive cost value of the verification method C is 3 and the comprehensive cost value of the verification method B is 4 (i.e. each of the comprehensive cost values is greater than the desired cost value EE), whichever verification method is used, the comprehensive cost value is greater than the desired cost EE, the value in the cell B1 is "0", thus "0" is filled in the cell B 1. Likewise, B2=0.

The value in the cell B3 (the cell located at the third row and fourth column) indicates the comprehensive efficiency value of the combination of the verification method C and the verification method B in the case that the desired cost value EE is 3. Since the comprehensive cost value of the verification method C is 3 and the comprehensive cost value of the verification method B is 4 (i.e. the comprehensive cost value of the verification method C is not greater than the desired cost value EE), if the verification method C is used, the comprehensive cost value is not greater than the desired cost EE, and if the verification method B is used, the comprehensive cost value is greater than the desired cost EE, thus, in this situation, only the verification method C may be used, the value in the cell B3 is the comprehensive efficiency value of the verification method C, thus "4" is filled in the cell B3. Likewise, values to be filled in the cells B4-B10 can be calculated.

Also, the values in the cells may be calculated by the state transition equation (6).

For example, the value in the cell B9 is calculated according to the state transition equation (6).

$$f[m,t]=\max\{f[m-1,t-ZC_m]+ZE_m, f[m-1,t]\} \quad (6)$$

At this time, m represents the verification method B, m−1 represents the verification method C, t=9, i.e. the state transition equation is converted into cell[B9]=max{cell[C5]+3, cell[C9]}, thus, the value to be filled in the cell B9 is 7.

3. Values in the cells A1-A10 are calculated

Assuming that the verification method C, the verification method B and the verification method A are available, the values in the cells A1-A10 can be calculated.

The value in the cell A1 (the cell located at the second row and second column) indicates the comprehensive efficiency value of the combination of the verification method C, the verification method B and the verification method A in the case that the desired cost value EE is 1. Since the comprehensive cost value of the verification method C is 3, the comprehensive cost value of the verification method B is 4 and the comprehensive cost value of the verification method A is 4 (i.e. each of the comprehensive cost values is greater than the desired cost value EE), whichever verification method is used, the comprehensive cost value is greater than the desired cost EE, the value in the cell A1 is "0", thus "0" is filled in the cell A1. Likewise, A2=0.

The value in the cell A3 (the cell located at the second row and fourth column) indicates the comprehensive efficiency value of the combination of the verification method C, the verification method B and the verification method A in the case that the desired cost value EE is 3. Since the comprehensive cost value of the verification method C is 3, the comprehensive cost value of the verification method B is 4 and the comprehensive cost value of the verification method A is 4 (i.e. the comprehensive cost value of the verification method C is not greater than the desired cost value EE), if the verification method C is used, the comprehensive cost value is not greater than the desired cost EE, if the verification method B is used, the comprehensive cost value is greater than the desired cost EE, and if the verification method A is used, the comprehensive cost value is greater than the desired cost EE, thus, in this situation, only the verification method C may be used, the value in the cell A3 is the comprehensive efficiency value of the verification method C, thus "4" is filled in the cell A3. Likewise, values to be filled in the cells A4-A10 can be calculated.

Also, the values in the cells may be calculated by the state transition equation (6).

Therefore, table 4 is obtained.

TABLE 4

|   | 1 | 2 | 3 | 4 | 5 | 6 | 7 | 8 | 9 | 10 | $ZE_j$ | $ZC_j$ |
|---|---|---|---|---|---|---|---|---|---|----|--------|--------|
| A | 0 | 0 | 4 | 4 | 4 | 4 | 7 | 7 | 7 | 7  | 3      | 4      |
| B | 0 | 0 | 4 | 4 | 4 | 4 | 7 | 7 | 7 | 7  | 3      | 4      |
| C | 0 | 0 | 4 | 4 | 4 | 4 | 4 | 4 | 4 | 4  | 4      | 3      |

In the table 4, A10=7, this means that if there are verification methods A, B and C, and the desired cost value EE is 10, the maximal value of the comprehensive efficiency value of the combination of the verification methods A, B and C is 7.

Then, the combination of verification methods with best efficiency may be determined.

Take the desired cost value EE being 10 as an example.

For A10, since $f[m-1,t-ZC_m]+ZE_m=\text{cell}[B6]+ZE_A=4+3=7 \, f[m-1,t]=\text{cell}[B10]$, the verification method A is not one of the combination of verification methods with best efficiency, i.e. $x_A=0$.

For B10, since $f[m-1,t-ZC_m]+ZE_m=\text{cell}[C6]+ZE_B=4+3=7>f[m-1,t]=\text{cell}[C10]$, the verification method B is one of the combination of verification methods with best efficiency, i.e. $x_B=1$.

Apparently, the verification method C is one of the combination of verification methods with best efficiency.

Thus, the combination of verification methods with best efficiency may be determined based on the state transition equation (6). And if the desired cost value EE is 10, the combination of verification methods with best efficiency is a combination of verification method B and verification method C, i.e. $(x_A,x_B,x_C)=(0,1,1)$.

Figure 3A:
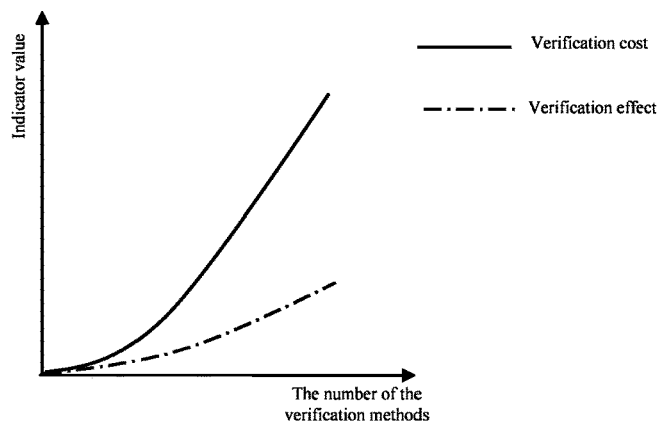
FIG. 3(a) is a schematic diagram illustrating a performance of a method for verifying a behavior in a route switching system in the related art.
Figure 3B:
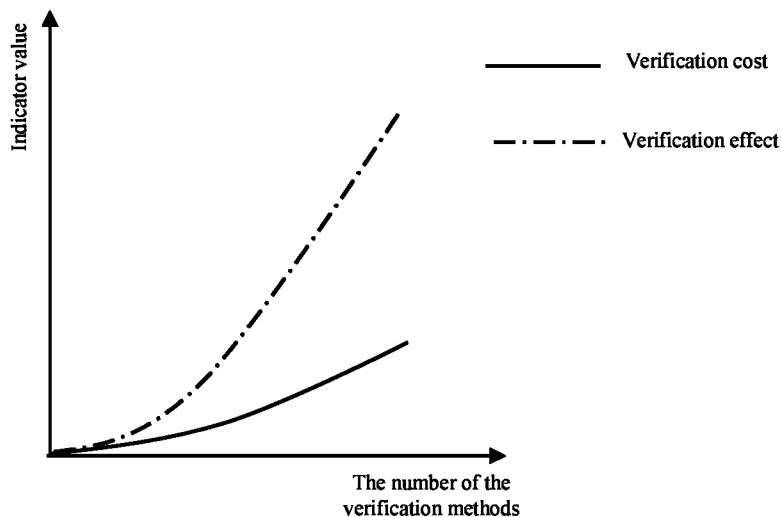
FIG. 3(b) is a schematic diagram illustrating a performance of a collaboration method for verifying a behavior in a route switching system according to an embodiment of the present disclosure.

FIG. 3(a) is a schematic diagram showing a performance of a method for verifying a behavior in a route switching system in the art. FIG. 3(b) is a schematic diagram illustrating a performance of a collaboration method for verifying a behavior in a route switching system according to an embodiment of the present disclosure. From FIG. 3(a) and FIG. 3(b), in the related art, with the exiting method using various verification methods, a better verification effect may be obtained, but the cost is increased greatly. However, with the collaboration method for verifying a behavior in a route switching system according to an embodiment of the present disclosure, a better verification effect and a lower cost may be achieved, i.e. an optimal cost performance is obtained.

Corresponding to the collaboration method for verifying a behavior in a route switching system according to embodiments of the present disclosure, the present disclosure further provides a collaboration device for verifying a behavior in a route switching system. With respect to the devices in the above embodiments, the specific manners for performing operations for individual modules therein have been described in detail in the embodiments regarding the method embodiments, which are not elaborated herein again.

Figure 4:
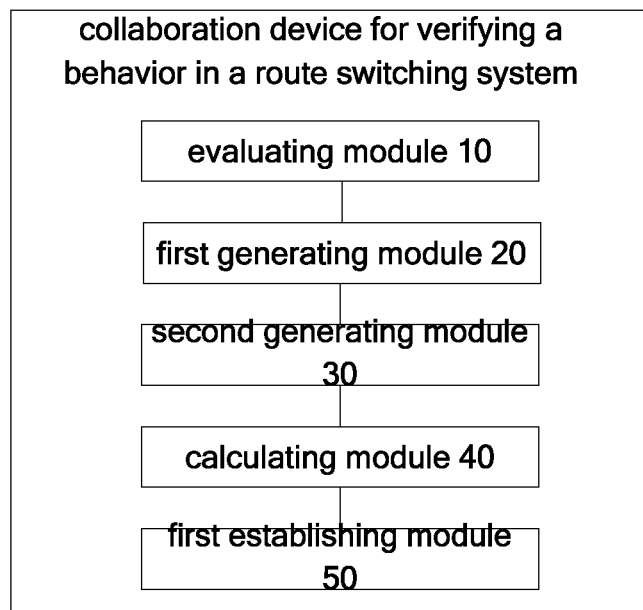
FIG. 4 is a block diagram illustrating a collaboration device for verifying a behavior in a route switching system according to an embodiment of the present disclosure.

FIG. 4 is a block diagram illustrating a collaboration device for verifying a behavior in a route switching system according to an embodiment of the present disclosure. As shown in FIG. 4, the collaboration device for verifying a behavior in a route switching system may include an evaluating module 10, a first generating module 20, a second generating module 30, a calculating module 40, and a first establishing module 50.

The evaluating module 10 is configured to evaluate a plurality of evaluating indicators in a plurality of verification methods to obtain valid evaluating indicators according to a predetermined requirement.

The first generating module 20 is configured to generate a comprehensive efficiency attribute value set and a comprehensive cost attribute value set according to the valid evaluating indicators;

The second generating module 30 is configured to generate weights of the valid evaluating indicators according to importance of the valid evaluating indicators;

The calculating module 40 is configured to calculate a comprehensive efficiency value corresponding to each verification method and a comprehensive cost value corresponding to each verification method according to the weights of the valid evaluating indicators and values of corresponding valid evaluating indicators in each verification method, in which the corresponding values of the valid evaluating indicators are obtained from the comprehensive efficiency attribute value set or the comprehensive cost attribute value set;

The first establishing module 50 is configured to establish a state transition equation according to the comprehensive efficiency value corresponding to each verification method and the comprehensive cost value corresponding to each verification method, and to solve the state transition equation so as to obtain an optimal solution.

In an embodiment, the plurality of evaluating indicators comprises evaluating indicators corresponding to a first verification of a data plane behavior in the route switching system and evaluating indicators corresponding to a second verification of a control plane behavior in the route switching system, and the collaboration device further includes a second establishing module, configured to establish a first extendible attribute value set corresponding to the first verification and a second extendible attribute value set corresponding to the second verification, in which the first extendible attribute value set includes the evaluating indicators corresponding to the first verification and the second extendible attribute value set includes the evaluating indicators corresponding to the second verification.

In an embodiment of the present disclosure, the plurality of evaluating indicators comprises: a verification result, a defect detection rate, a labor requirement, time required, and a fund demand.

In an embodiment of the present disclosure, the evaluating module includes:

a determining sub-module, configured to determine whether the plurality of evaluating indicators satisfy the predetermined requirement;

an obtaining sub-module, configured to obtain the valid evaluating indicators corresponding to the predetermined requirement if the plurality of evaluating indicators satisfy the predetermined requirement;

an adding sub-module, configured to add new evaluating indicators according to the predetermined requirement if the plurality of evaluating indicators do not satisfy the predetermined requirement, wherein whether the new evaluating indicators satisfy the predetermined requirement is determined by the determining sub-module.

In an embodiment of the present disclosure, a weight of a valid evaluating indicator in the comprehensive efficiency attribute value set is subject to formula (1):

$$\sum_{i \in VFE} W_i = 1, W_i \in \{Q^+\}, \quad (1)$$

and a weight of a valid evaluating indicator in the comprehensive cost attribute value set is subject to formula (2):

$$\sum_{j \in VFC} W_j = 1, W_j \in \{Q^+\}, \quad (2)$$

where VFE represents the comprehensive efficiency attribute value set, $W_i$ represents a weight of a $i^{th}$ valid evaluating indicator, VFC represents the comprehensive cost attribute value set, $W_j$ represents a weight of a $j^{th}$ valid evaluating indicator, and $Q^+$ represents a set of rationals.

In an embodiment, the comprehensive efficiency value corresponding to each verification method is calculated according to formula (3):

$$ZE_m = \text{Round}\left[\frac{\sum_{i \in VFE} W_i * V_{im}}{\sum_{m \in MV}\sum_{i \in VFE} W_i * V_{im}} * 10\right], \quad (3)$$

and the comprehensive cost value corresponding to each verification method is calculated according to formula (4):

$$ZC_m = \text{Round}\left[\frac{\sum_{j \in VFC} W_j * V_{jm}}{\sum_{m \in MV}\sum_{j \in VFC} W_j * V_{jm}} * 10\right], \quad (4)$$

where MV represents the plurality of verification methods, $ZE_m$ represents a comprehensive efficiency value corresponding to a $m^{th}$ verification method, $V_{im}$ represents a value of the $i^{th}$ valid evaluating indicator in the $m^{th}$ verification method, and $ZC_m$ represents a comprehensive cost value corresponding to the $m^{th}$ verification method, $V_{jm}$ represents a value of the $j^{th}$ valid evaluating indicator in the $m^{th}$ verification method.

With the collaboration device for verifying a behavior in a route switching system according to embodiments of the present disclosure, the combination of verification methods achieving the most effective behavior verification may be determined, the accuracy and comprehensiveness of verifying the behavior in the route switching system may be increased and the cost and time of verifying the behavior in the route switching system may be reduced, such that the reliably and benefit of verifying the behavior in the route switching system may be improved.

In the following, a non-transitory computer-readable storage medium according to embodiments of the present disclosure will be described in detail.

In some embodiments, the non-transitory computer-readable storage medium having stored therein instructions that, when executed by a processor of a device, causes the terminal to perform a collaboration method for verifying a behavior in a route switching system.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present disclosure may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A collaboration method for verifying a behavior in a route switching system, comprising:
    evaluating a plurality of evaluating indicators in a plurality of existing verification methods for evaluating a behavior of a route switching system to obtain valid evaluating indicators according to a predetermined requirement predetermined by a user;
    generating a comprehensive efficiency attribute value set and a comprehensive cost attribute value set according to the valid evaluating indicators;
    generating weights of the valid evaluating indicators according to importance of the valid evaluating indicators, wherein the importance of the valid evaluating indicators is determined by the user;
    calculating a comprehensive efficiency value corresponding to each of the plurality of existing verification methods and a comprehensive cost value corresponding to each of the plurality of existing verification methods according to the weights of the valid evaluating indicators and corresponding values of the valid evaluating indicators in each of the plurality of existing verification methods, wherein the corresponding values of the valid evaluating indicators are obtained from the comprehensive efficiency attribute value set or the comprehensive cost attribute value set, wherein the weights of the valid evaluating indicators are predetermined by the user;
    establishing a state transition equation according to the comprehensive efficiency value corresponding to each of the plurality of existing verification methods and the comprehensive cost value corresponding to each of the plurality of existing verification methods, and solving the state transition equation to obtain an optimal cost-efficiency solution, which is a combination of several existing verification methods that are the solution of the state transition equation;

launching, by a route switching system behavior testing equipment including at least one processor, a plurality of testing packets from a source node to a plurality of nodes along a route of the route switching system, including a destination node, and returning to the source node; and using, by the route switching system behavior testing equipment, the combination of several existing verification methods to test the behavior of the route switching system.

2. The collaboration method according to claim 1, wherein the plurality of evaluating indicators comprises evaluating indicators corresponding to a first verification of a data plane behavior in the route switching system and evaluating indicators corresponding to a second verification of a control plane behavior in the route switching system, and the collaboration method further comprises:

establishing a first extendible attribute value set corresponding to the first verification and a second extendible attribute value set corresponding to the second verification, wherein the first extendible attribute value set comprises the evaluating indicators corresponding to the first verification and the second extendible attribute value set comprises the evaluating indicators corresponding to the second verification.

3. The collaboration method according to claim 1, wherein the plurality of evaluating indicators comprises: a verification result, a defect detection rate, a labor requirement, time required, and a fund demand.

4. The collaboration method according to claim 1, wherein evaluating a plurality of evaluating indicators in a plurality of verification methods to obtain valid evaluating indicators according to a predetermined requirement comprises:

determining whether the plurality of evaluating indicators are in conformity with the predetermined requirement;

obtaining the valid evaluating indicators corresponding to the predetermined requirement if the plurality of evaluating indicators are in conformity with the predetermined requirement;

adding new evaluating indicators according to the predetermined requirement if the plurality of evaluating indicators are not in conformity with the predetermined requirement and determining whether the new evaluating indicators are in conformity with the predetermined requirement.

5. The collaboration method according to claim 1, wherein a weight of a valid evaluating indicator in the comprehensive efficiency attribute value set is subject to formula (1):

$$\sum_{i \in VFE} W_i = 1, W_i \in \{Q^+\}, \quad (1)$$

and a weight of a valid evaluating indicator in the comprehensive cost attribute value set is subject to formula (2):

$$\sum_{j \in VFC} W_j = 1, W_j \in \{Q^+\}, \quad (2)$$

where VFE represents the comprehensive efficiency attribute value set, $W_i$ represents a weight of a $i^{th}$ valid evaluating indicator, VFC represents the comprehensive cost attribute value set, $W_j$ represents a weight of a $j^{th}$ valid evaluating indicator, and $Q^+$ represents a set of rationals.

6. The collaboration method according to claim 5, wherein the comprehensive efficiency value corresponding to each verification method is calculated according to formula (3):

$$ZE_m = \text{Round}\left[\frac{\sum_{i \in VFE} W_i * V_{im}}{\sum_{m \in MV} \sum_{i \in VFE} W_i * V_{im}} * 10\right], \quad (3)$$

and the comprehensive cost value corresponding to each verification method is calculated according to formula (4):

$$ZC_m = \text{Round}\left[\frac{\sum_{j \in VFC} W_j * V_{jm}}{\sum_{m \in MV} \sum_{j \in VFC} W_j * V_{jm}} * 10\right], \quad (4)$$

where MV represents the plurality of verification methods, $ZE_m$ represents a comprehensive efficiency value corresponding to a $m^{th}$ verification method, $V_{im}$ represents a value of the $i^{th}$ valid evaluating indicator in the $m^{th}$ verification method, and $ZC_m$ represents a comprehensive cost value corresponding to the $m^{th}$ verification method, $V_{jm}$ represents a value of the $j^{th}$ valid evaluating indicator in the $m^{th}$ verification method.

7. A collaboration device for verifying a behavior in a route switching system, comprising:

an evaluating module, configured to evaluate a plurality of evaluating indicators in a plurality of existing verification methods for evaluating a behavior of a route switching system to obtain valid evaluating indicators according to a predetermined requirement predetermined by a user;

a first generating module, configured to generate a comprehensive efficiency attribute value set and a comprehensive cost attribute value set according to the valid evaluating indicators;

a second generating module, configured to generate weights of the valid evaluating indicators according to importance of the valid evaluating indicators, wherein the importance of the valid evaluating indicators is determined by the user;

a calculating module, configured to calculate a comprehensive efficiency value corresponding to each of the plurality of existing verification methods and a comprehensive cost value corresponding to each of the plurality of existing verification methods according to the weights of the valid evaluating indicators and corresponding values of the valid evaluating indicators in each of the plurality of existing verification methods, wherein the corresponding values of the valid evaluating indicators are obtained from the comprehensive efficiency attribute value set or the comprehensive cost attribute value set, wherein the weights of the valid evaluating indicators are predetermined by the user;

a first establishing module, configured to establish a state transition equation according to the comprehensive efficiency value corresponding to each of the plurality of existing verification method and the comprehensive cost value corresponding to each of the plurality of existing verification methods, and to solve the state transition equation so as to obtain an optimal cost-efficiency solution, which is a combination of several existing verification methods that are the solution of the state transition equation; and a route switching system behavior testing equipment including at least one processor, for launching a plurality of testing packets from a source node to a plurality of nodes along a route of the route switching system, including a destination node, and returning to the source node; and using the combination of several existing verification methods to test the behavior of the route switching system.

8. The collaboration device according to claim 7, wherein the plurality of evaluating indicators comprises evaluating indicators corresponding to a first verification of a data plane behavior in the route switching system and evaluating indicators corresponding to a second verification of a control plane behavior in the route switching system, and the collaboration device further comprises:

a second establishing module, configured to establish a first extendible attribute value set corresponding to the first verification and a second extendible attribute value set corresponding to the second verification, wherein the first extendible attribute value set comprises the evaluating indicators corresponding to the first verification and the second extendible attribute value set comprises the evaluating indicators corresponding to the second verification.

9. The collaboration device according to claim 7, wherein the plurality of evaluating indicators comprises: a verification result, a defect detection rate, a labor requirement, time required, and a fund demand.

10. The collaboration device according to claim 7, wherein the evaluating module comprises:

a determining sub-module, configured to determine whether the plurality of evaluating indicators are in conformity with the predetermined requirement;

an obtaining sub-module, configured to obtain the valid evaluating indicators corresponding to the predetermined requirement if the plurality of evaluating indicators are in conformity with the predetermined requirement;

an adding sub-module, configured to add new evaluating indicators according to the predetermined requirement if the plurality of evaluating indicators are not in conformity with the predetermined requirement, wherein whether the new evaluating indicators are in conformity with the predetermined requirement is determined by the determining sub-module.

11. The collaboration device according to claim 7, wherein a weight of a valid evaluating indicator in the comprehensive efficiency attribute value set is subject to formula (1):

$$\sum_{i \in VFE} W_i = 1, W_i \in \{Q^+\}, \quad (1)$$

and a weight of a valid evaluating indicator in the comprehensive cost attribute value set is subject to formula (2):

$$\sum_{j \in VFC} W_j = 1, W_j \in \{Q^+\}, \quad (2)$$

where VFE represents the comprehensive efficiency attribute value set, $W_i$ represents a weight of a $i^{th}$ valid evaluating indicator, VFC represents the comprehensive cost attribute value set, $W_j$ represents a weight of a $j^{th}$ valid evaluating indicator, and $Q^+$ represents a set of rationals.

12. The collaboration device according to claim 11, wherein the comprehensive efficiency value corresponding to each verification method is calculated according to formula (3):

$$ZE_m = \text{Round}\left[\frac{\sum_{i \in VFE} W_i * V_{im}}{\sum_{m \in MV} \sum_{i \in VFE} W_i * V_{im}} * 10\right], \quad (3)$$

and the comprehensive cost value corresponding to each verification method is calculated according to formula (4):

$$ZC_m = \text{Round}\left[\frac{\sum_{j \in VFC} W_j * V_{jm}}{\sum_{m \in MV} \sum_{j \in VFC} W_j * V_{jm}} * 10\right], \quad (4)$$

where MV represents the plurality of verification methods, $ZE_m$ represents a comprehensive efficiency value corresponding to a $m^{th}$ verification method, $V_{im}$ represents a value of the $i^{th}$ valid evaluating indicator in the $m^{th}$ verification method, and $ZC_m$ represents a comprehensive cost value corresponding to the $m^{th}$ verification method, $V_{jm}$ represents a value of the $j^{th}$ valid evaluating indicator in the $m^{th}$ verification method.

13. The collaboration device according to claim 7, comprising:

a non-transitory computer-readable medium comprising computer-executable instructions stored thereon; and an instruction execution system, which is configured by the instructions to implement at least one of the evaluating module, first generating module, second generating module, calculating module and first establishing module.

14. A non-transitory computer-readable storage medium having stored therein instructions that, when executed by a processor of a device, causes the device to perform a collaboration method for verifying a behavior in a route switching system, wherein the method comprises acts of:

evaluating a plurality of evaluating indicators in a plurality of existing verification methods for evaluating a behavior of a route switching system to obtain valid evaluating indicators according to a predetermined requirement predetermined by a user;

generating a comprehensive efficiency attribute value set and a comprehensive cost attribute value set according to the valid evaluating indicators;

generating weights of the valid evaluating indicators according to importance of the valid evaluating indicators, wherein the importance of the valid evaluating indicators is determined by the user;

calculating a comprehensive efficiency value corresponding to each of the plurality of existing verification methods and a comprehensive cost value corresponding to each of the plurality of existing verification methods according to the weights of the valid evaluating indicators and values of the valid evaluating indicators in each of the plurality of existing verification methods, wherein the weights of the valid evaluating indicators are predetermined by the user;

establishing a state transition equation according to the comprehensive efficiency value corresponding to each verification method and the comprehensive cost value corresponding to each verification method, and solving the state transition equation to obtain an optimal cost-efficiency solution, which is a combination of several existing verification methods that are the solution of the state transition equation; and enabling a route switching system behavior testing equipment including at least one processor to launch a plurality of testing packets from a source node to a plurality of nodes along a route of the route switching system, including a destination node, and returning to the source node; and to use the combination of several existing verification methods to test the behavior of the route switching system.

* * * * *